US011151763B2

(12) United States Patent
Yang et al.

(10) Patent No.: US 11,151,763 B2
(45) Date of Patent: Oct. 19, 2021

(54) INFORMATION PRESENTATION DEVICE, INFORMATION PRESENTATION METHOD, AND STORAGE MEDIUM

(71) Applicants: Kabushiki Kaisha Toshiba, Minato-ku (JP); Toshiba Digital Solutions Corporation, Kawasaki (JP)

(72) Inventors: Yeonsoo Yang, Machida (JP); Yukako Tanaka, Yokkaichi (JP); Go Fujino, Kiyose (JP); Fumiaki Oohata, Kawasaki (JP); Katsuya Hino, Yokohama (JP); Saki Sakai, Yokohama (JP)

(73) Assignees: Kabushiki Kaisha Toshiba, Minato-ku (JP); Toshiba Digital Solutions Corporation, Kawasaki (JP)

( * ) Notice: Subject to any disclaimer, the term of this patent is extended or adjusted under 35 U.S.C. 154(b) by 0 days.

(21) Appl. No.: 16/577,434

(22) Filed: Sep. 20, 2019

(65) Prior Publication Data

US 2020/0020142 A1 Jan. 16, 2020

Related U.S. Application Data

(63) Continuation of application No. PCT/JP2017/034697, filed on Sep. 26, 2017.

(30) Foreign Application Priority Data

Mar. 22, 2017 (JP) .............................. JP2017-056150

(51) Int. Cl.
*G06T 11/20* (2006.01)
*G06F 16/28* (2019.01)
(Continued)

(52) U.S. Cl.
CPC ............ *G06T 11/206* (2013.01); *G06F 16/26* (2019.01); *G06F 16/283* (2019.01); *G06F 3/04842* (2013.01); *G06F 3/04847* (2013.01)

(58) Field of Classification Search
CPC .. G06F 3/04842; G06F 3/04847; G06F 16/26; G06F 16/283; G06T 11/206
See application file for complete search history.

(56) References Cited

U.S. PATENT DOCUMENTS 6,356,285 B1 * 3/2002 Burkwald ................. G06F 8/75
345/440
6,707,454 B1 * 3/2004 Barg ..................... G06K 9/6253
345/440
(Continued)

FOREIGN PATENT DOCUMENTS

EP 0 924 604 A2 6/1999
EP 1 077 420 A2 2/2001
(Continued)

OTHER PUBLICATIONS

International Search Report dated Dec. 12, 2017 in PCT/JP2017/034697, filed Sep. 26, 2017 (with English translation).

*Primary Examiner* — Michael Le
(74) *Attorney, Agent, or Firm* — Oblon, McClelland, Maier & Neustadt, L.L.P.

(57) ABSTRACT

An information presentation device includes a plot unit, a histogram generation unit, and a visual information generation unit. The plot unit plots a plurality of values included in each of a plurality of pieces of multidimensional data on a plurality of axes in a parallel coordinate plot coordinate system. The histogram generation unit divides each of the plurality of axes into a plurality of sections, and generates a plurality of histogram bars each of which corresponds to the number of values plotted in each section in the plurality of sections. When one or more values are selected as selected (Continued)

values, the visual information generation unit generates visual information with which the ratio of the number of selected values to the total number of values contained in any one histogram bar out of the respective histogram bars generated by the histogram generation unit can be identified.

10 Claims, 10 Drawing Sheets

(51) Int. Cl.
    *G06F 16/26*     (2019.01)
    *G06F 3/0484*     (2013.01)

(56) References Cited

U.S. PATENT DOCUMENTS

| | | | |
|---|---|---|---|
| 8,346,682 B2 | 1/2013 | Steed et al. | |
| 10,510,117 B1* | 12/2019 | Romo | G06Q 40/06 |
| 2003/0088542 A1* | 5/2003 | McGee | G06F 17/18 |
| 2004/0027350 A1* | 2/2004 | Kincaid | G06T 11/206 345/440 |
| 2007/0005582 A1* | 1/2007 | Navratil | G06F 16/2428 |
| 2008/0235075 A1* | 9/2008 | Couture | G06F 11/3438 709/224 |
| 2010/0191678 A1* | 7/2010 | Steed | G06T 11/206 706/11 |
| 2012/0137238 A1* | 5/2012 | Abeln | G06F 3/04847 715/771 |
| 2013/0155058 A1* | 6/2013 | Golparvar-Fard | G06T 17/00 345/419 |
| 2016/0098173 A1* | 4/2016 | Slawinski | G06Q 30/02 715/739 |
| 2016/0103559 A1* | 4/2016 | Maheshwari | G06F 3/0481 715/738 |
| 2018/0260451 A1* | 9/2018 | Ding | G06F 16/2462 |

FOREIGN PATENT DOCUMENTS

| | | |
|---|---|---|
| JP | 11-272460 A | 10/1999 |
| JP | 2001-67486 A | 3/2001 |
| WO | WO 2015/193983 A1 | 12/2015 |

\* cited by examiner

INFORMATION PRESENTATION DEVICE, INFORMATION PRESENTATION METHOD, AND STORAGE MEDIUM

CROSS REFERENCE TO RELATED APPLICATION

This application is a continuation application of PCT/JP2017/034697 filed on Sep. 26, 2017 and claims benefit of Japanese Application No. 2017-056150 filed in Japan on Mar. 22, 2017, the entire contents of which are incorporated herein by this reference.

FIELD

An embodiment of the present invention herein relates generally to an information presentation device, an information presentation method and a storage medium.

BACKGROUND

BI (business intelligence) tools for processing and visualizing a large quantity of data which has been accumulated in advance have been conventionally used. For example, some of the BI tools have a function of representing a large quantity of data accumulated in advance in a PCP (parallel coordinate plot) coordinate system.

PCP has been conventionally known as a visualization method of plotting (arranging) a plurality of values contained in one piece of data on a plurality of axes arranged in parallel for each of a plurality of pieces of data, and performing such processing as connecting respective plot points by lines.

However, in the case of PCP, there are some cases where visualization suitable for analysis of desired data contained in a large quantity of data accumulated in advance is not performed. Specifically, in the case of PCP, for example, visualization may not be performed which enables tracking of a desired value selected from a plurality of values plotted on a plurality of axes.

DETAILED DESCRIPTION

An embodiment has an object to provide an information presentation device, an information presentation method, and a storage medium that are capable of performing visualization suitable for analysis of desired data included in a large quantity of data.

The information presentation device according to the embodiment includes a plot unit, a histogram generation unit, and a visual information generation unit. The plot unit plots a plurality of values contained in each of a plurality of pieces of multidimensional data on a plurality of axes in a parallel coordinate plot coordinate system. The histogram generation unit divides each of the plurality of axes into a plurality of sections, and generates a histogram including a plurality of histogram bars each of which corresponds to the number of values plotted within each section in the plurality of sections. When one or more values of the respective values plotted on the plurality of axes are selected as selected values, the visual information generation unit generates visual information that makes it possible to identify the ratio of the number of the selected values to the total number of values contained in any one histogram bar out of respective histogram bars generated by the histogram generation unit.

Hereinafter, the embodiment will be described with reference to the drawings.

Figure 1:
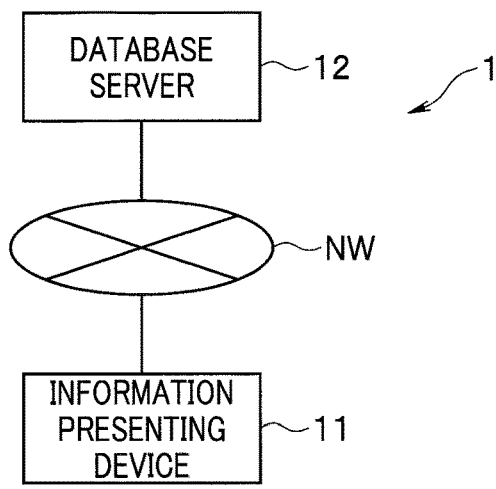
FIG. 1 is a diagram showing an example of a configuration of an information presentation system including an information presentation device according to an embodiment.

As shown in FIG. 1, the information presentation system 1 is configured to include an information presentation device 11 which is a personal computer or the like to be operated by a user, and a database server 12 connected to the information presentation device 11 via a network NW. FIG. 1 is a diagram showing an example of a configuration of the information presentation system according to the embodiment.

Figure 2:
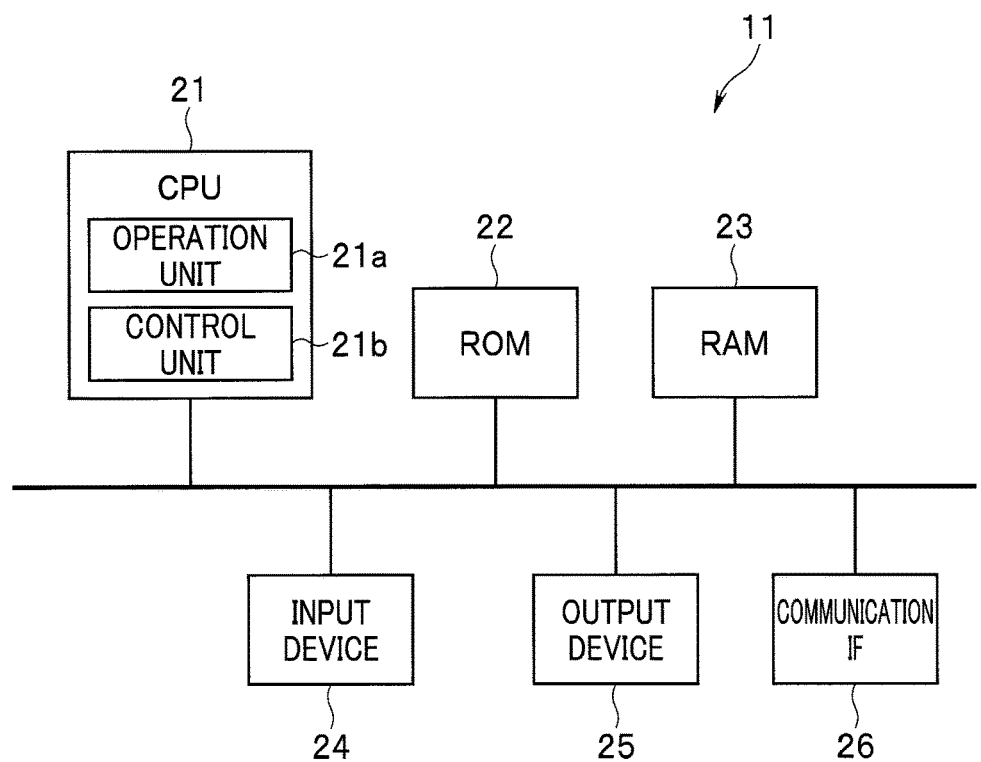
FIG. 2 is a diagram showing an example of a configuration of the information presentation device according to the embodiment.

As shown in FIG. 2, the information presentation device 11 is configured to include, for example, CPU 21, ROM (read only memory) 22, RAM (random access memory) 23, an input device 24, an output device 25, and a communication IF (interface) 26.

The CPU 21 is configured to include an operation unit 21a configured to perform drawing processing and the like based on a program or the like stored in the ROM 22 while using the RAM 23 as a working area. The CPU 21 is configured to include a control unit 21b that is configured to perform control related to the operation of each unit of the information presentation device 11 based on information, an instruction and the like input according to an operation of the input device 24.

The input device 24 is configured to be able to input information, an instruction and the like corresponding to a user's operation. Specifically, the input device 24 is configured to include, for example, at least one of a keyboard, a mouse, and a touch panel.

The output device 25 is configured to be able to output information generated according to the processing of the CPU 21 and the like to the outside. Specifically, the output device 25 is configured to include, for example, a display or a printer.

The communication IF 26 is configured by a device capable of transmitting and receiving data and the like to and from the database server 12 via the network NW.

In the database server 12, for example, a plurality of pieces of multidimensional data that can be outputted in a format which makes the data available in processing related to visualization of data (hereinafter abbreviated as "data visualization processing"), such as a CSV format are stored. Each piece of multidimensional data stored in the database server 12 includes a plurality of values that can be plotted (arranged) on a plurality of axes in the PCP coordinate system.

Figure 3:
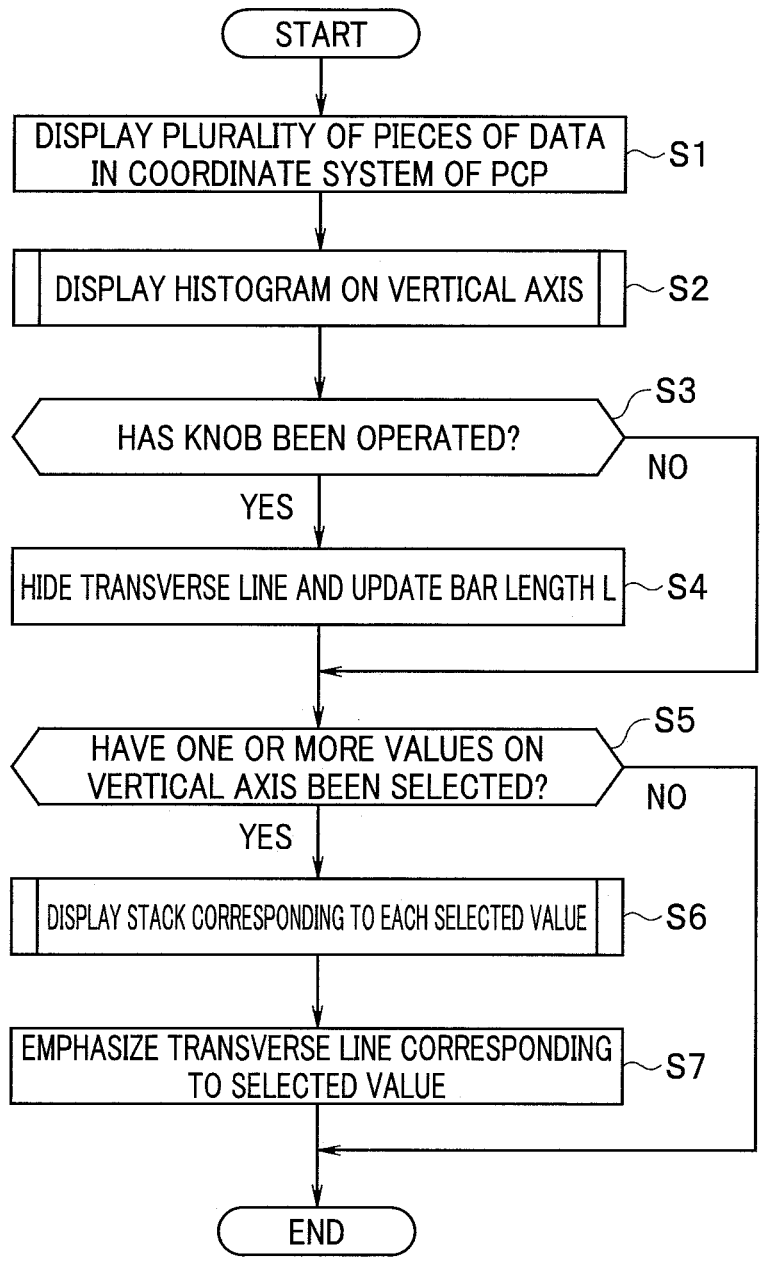
FIG. 3 is a flowchart showing a specific example of processing performed in the information presentation device according to the embodiment.

Next, a specific example of the data visualization processing according to the embodiment will be described with reference to FIG. 3. Note that the following description will be made by exemplifying a case where main processing in the data visualization processing is performed by CPU 21. Furthermore, the following description will be made by exemplifying a case where a display image containing information drawn by the data visualization processing is displayed on the screen of the output device 25 which is a display. Furthermore, the following description will be made by exemplifying a case where a plurality of axes in the PCP coordinate system are set as vertical axes, means that allows a user to manipulate a range (hereinafter referred to as "knob") is provided at both ends of the vertical axis (see FIG. 5), and respective points plotted on a plurality of vertical axes are connected to one another by transverse lines. FIG. 3 is a flowchart showing a specific example of process performed in the information presentation device according to the embodiment.

Based on a plurality of pieces of multidimensional data read from the database server 12 via the network NW, the operation unit 21a performs drawing processing for displaying the plurality of pieces of multidimensional data in the PCP coordinate system (step S1 in FIG. 3). In other words, the operation unit 21a having a function as a plotting unit performs processing for plotting (arranging) a plurality of values contained in each of the plurality of pieces of multidimensional data read from the database server 12 on the vertical axes in the PCP coordinate system. Note that in the present embodiment, it is assumed that the drawing processing corresponding to a predetermined drawing engine such as a web browser is performed in the operation unit 21a.

Figure 5:
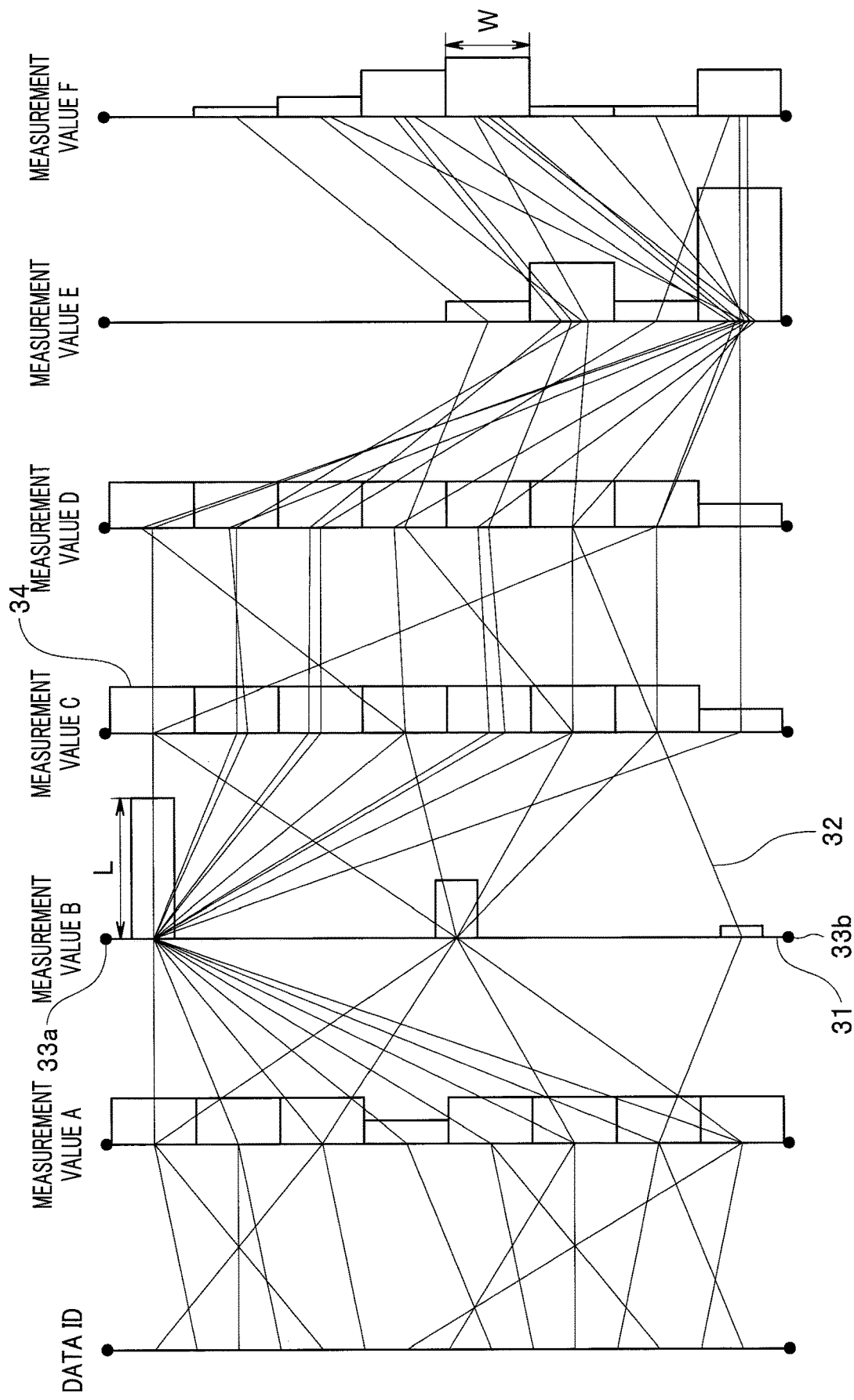
FIG. 5 is a diagram showing an example of information displayed in the information presentation device according to the embodiment.

The operation unit 21a performs the drawing processing for displaying a histogram on a vertical axis of the PCP coordinate system contained in a processing result of step S1 of FIG. 3 (step S2 of FIG. 3). Note that the histogram is represented, for example, as bar-shaped figures which are in contact with one another and originally used to visually recognize a distribution state of data like a figure corresponding to a measurement value D in FIG. 5. However, in the present specification, for example, a figure represented by a bar graph in which bar-shaped figures are separated from one another because measurement values are discrete values such as attributes like a figure corresponding to a measurement value B in FIG. 5 is also referred to as a histogram for the sake of convenience.

Figure 4:
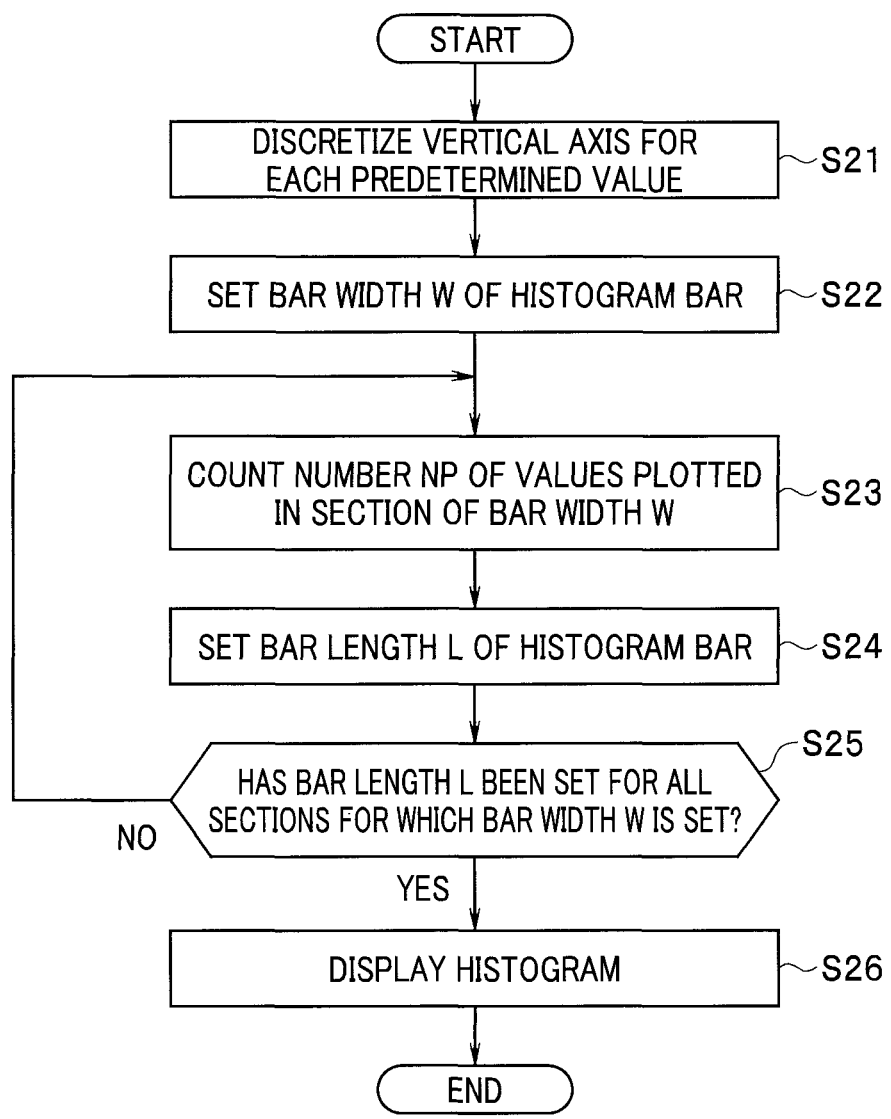
FIG. 4 is a flowchart showing a specific example of processing performed in the information presentation device according to the embodiment.

Here, a specific example of the processing and the like which are performed in step S2 of FIG. 3 will be described with reference to FIG. 4. Note that the present embodiment will be described on the assumption that each histogram bar included in a histogram (hereinafter, a bar-shaped figure constituting the histogram is referred to as a "histogram bar") is drawn as an object which is laterally elongated with the vertical axis of the PCP coordinate system as an origin. FIG. 4 is a flowchart showing a specific example of the processing performed in the information presentation device according to the embodiment.

The operation unit 21a performs processing for discretizing the vertical axis in the PCP coordinate system on a predetermined value basis (step S21 in FIG. 4).

The operation unit 21a sets a bar width W, which is the width of a histogram bar on the vertical axis of the PCP coordinate system, based on the processing result of step S21 of FIG. 4 (step S22 of FIG. 4). Note that the bar width W may be changed, for example, according to a user's operation on the input device 24.

The operation unit 21a counts the number NP of values (plot points) plotted within a section having the bar width W set by the processing of step S22 of FIG. 4 out of respective values plotted on the vertical axis of the PCP coordinate system (step S23 in FIG. 4). Furthermore, the operation unit 21a stores the number NP obtained by the processing of step S23 of FIG. 4 in the RAM 23 while associating the number NP with each section having the bar width W.

The operation unit 21a sets a bar length L, which is the length of a histogram bar extending in a traverse direction of the PCP coordinate system, according to the magnitude of the number NP counted in step S23 in FIG. 4 (step S24 in FIG. 4).

The operation unit 21a determines whether the bar length L has been set for all sections for which the bar width W has been set on the vertical axis of the PCP coordinate system (step S25 in FIG. 4).

When there is a section for which the bar length L has not yet been set among all the sections for which the bar width W has been set (S25: NO), the operation unit 21a repeatedly performs the processing from step S23 in FIG. 4. When the bar length L has been set for all the sections for which the bar width W has been set (S25: YES), the operation unit 21a performs the drawing processing for displaying a histogram containing a plurality of histogram bars on the vertical axis in the PCP coordinate system (step S26 of FIG. 4), and then ends a series of processing of FIG. 4.

In other words, the operation unit 21a having a function as a histogram generation unit divides each vertical axis of the PCP coordinate system into a plurality of sections, and performs processing for generating a histogram including a plurality of histogram bars corresponding to the number of values plotted within each section of the plurality of sections.

The control unit 21b performs control to display a display image containing information as shown in FIG. 5 on the screen of the output device 25 based on the processing result of step S2 of FIG. 3. Specifically, the control unit 21b performs control to display, on the screen of the output device 25, a display image including a plurality of vertical axes 31 constituting the PCP coordinate system, traverse lines 32 connecting respective points plotted on the vertical axes 31, knobs 33a drawn at upper portions of the vertical axes 31, knobs 33b drawn at lower portions of the vertical axes 31, and histogram bars 34 extending in the traverse direction from the vertical axes 31. FIG. 5 is a diagram showing an example of information displayed in the information presentation device according to the embodiment.

The knob 33a is drawn as an interface capable of adjusting the upper limit of each value plotted on the vertical axis 31 according to the user's operation on the input device 24.

The knob 33b is drawn as an interface capable of adjusting the lower limit of each value plotted on the vertical axis 31 according to the user's operation on the input device 24.

"Data ID" in FIG. 5 indicates a unique number preassigned to each piece of multidimensional data read from the database server 12. Furthermore, "measurement value A", "measurement value B", "measurement value C", "measurement value D", "measurement value E", and measurement value F" indicate names such as attributes or units of a plurality of values included in each piece of multidimensional data read from the database server 12. Specifically, in FIG. 5, for example, the "measurement value B" represents an attribute of an individual or the like, and each of the measurement values other than the "measurement value B" represents a numerical value measured for each individual.

Note that the present embodiment will be described by exemplifying a case where the respective vertical axes 31 of the "measurement value A" to the "measurement value F" in FIG. 5 are drawing targets of the histogram, and the vertical axis 31 of the "data ID" of FIG. 5 is excluded from the drawing targets of the histogram (because the vertical axis 31 of the "data ID" is the reference axis in the PCP coordinate system). In the present embodiment, for convenience of illustration, it is assumed that the positions of at least some of plot points plotted on the vertical axis 31 of the PCP coordinate system are adjusted to positions at which the respective traverse lines 32 do not overlap one another as much as possible.

The control unit 21b detects whether one of the knobs 33a and 33b contained in a display image displayed according to the processing of step S2 of FIG. 3 has been operated (step S3 of FIG. 3).

When the control unit 21b cannot detect the operation of the knobs 33a and 33b (S3: NO), the control unit 21b proceeds to execute processing of step S5 of FIG. 3 described later. When the control unit 21b detects that either the knob 33a or the knob 33b has been operated (S3: YES), the control unit 21b causes the operation unit 21a to execute processing (step S4 of FIG. 3) for hiding the traverse lines 32 corresponding to respective plot points out of a range sandwiched between the knobs 33a and 33b, and processing (step S4 of FIG. 3) for updating (setting) the bar length L of each histogram bar 34 while the respective plot points are excluded, and then proceeds to execute the processing of step S5 of FIG. 3.

Figure 6:
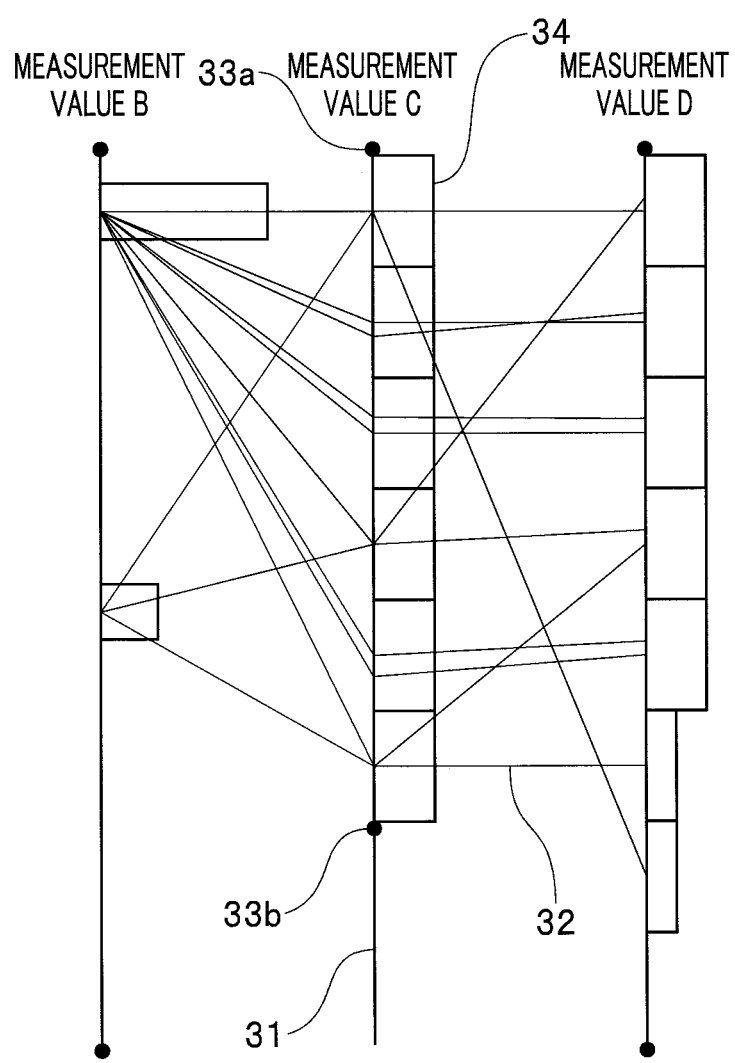
FIG. 6 is a diagram describing an example when a knob is operated.

According to the control of step S4 in FIG. 3, the operation unit 21a executes processing of specifying a vertical axis 31 on which either the knob 33a or the knob 33b has been operated, detecting the respective plot points out of a range sandwiched between the knobs 33a and 33b on the specified vertical axis 31, and excluding the traverse lines 32 corresponding to multidimensional data containing the detected respective plot points, thereby hiding the traverse lines 32 corresponding to the respective plot points. Furthermore, according to the control of step S4 of FIG. 3, the operation unit 21a executes processing similar to the processing of step S23 to step S25 of FIG. 4 in a state where the respective plot points out of the range sandwiched between the knobs 33a and 33b are excluded, thereby updating the bar length L of each histogram bar 34. For example, when the knob 33b of the vertical axis 31 corresponding to the "measurement value C" in FIG. 5 has been operated, a display image containing information as shown in FIG. 6 is displayed on the screen of the output device 25. FIG. 6 is a diagram describing an example when the knob has been operated.

In other words, when a range for limiting values available to generate a histogram is set on at least one of the plurality of vertical axes in the PCP coordinate system, the operation unit 21a sets the length of each histogram bar according to the number of values contained in the range.

Note that it is assumed in FIG. 6 that each histogram bar 34 the bar length of which has been updated to the bar length L=0 is hidden like the traverse line 32. For convenience of description, the following description will be made by exemplifying a case where the knobs 33a and 33b have not been operated on each vertical axis 31 as a main example.

The control unit 21b detects whether an operation for selecting one or more values on the vertical axis 31 contained in the display image displayed according to the processing of step S2 of FIG. 3 has been performed (step S5 of FIG. 3). In other words, in step S5 of FIG. 3, the control unit 21b detects whether an operation associated with setting of a selection range for selecting one or more values on the vertical axis 31 contained in the display image displayed according to the processing of step S2 of FIG. 3 has been performed.

When the control unit 21b cannot detect the operation for selecting one or more values on the vertical axis 31 (S5: NO), the control unit 21b finishes the series of processing in FIG. 3. When the control unit 21b detects that the operation for selecting one or more values on the vertical axis 31 has been performed (S5: YES), the control unit 21b causes the operation unit 21a to execute processing (step S6 of FIG. 3) for displaying stacks corresponding to stacked bar-shaped figures (see FIG. 8) according to respective values selected by the above operation, and processing (step S7 in FIG. 3) for emphasizing the traverse line 32 corresponding to the respective selected values.

Figure 7:
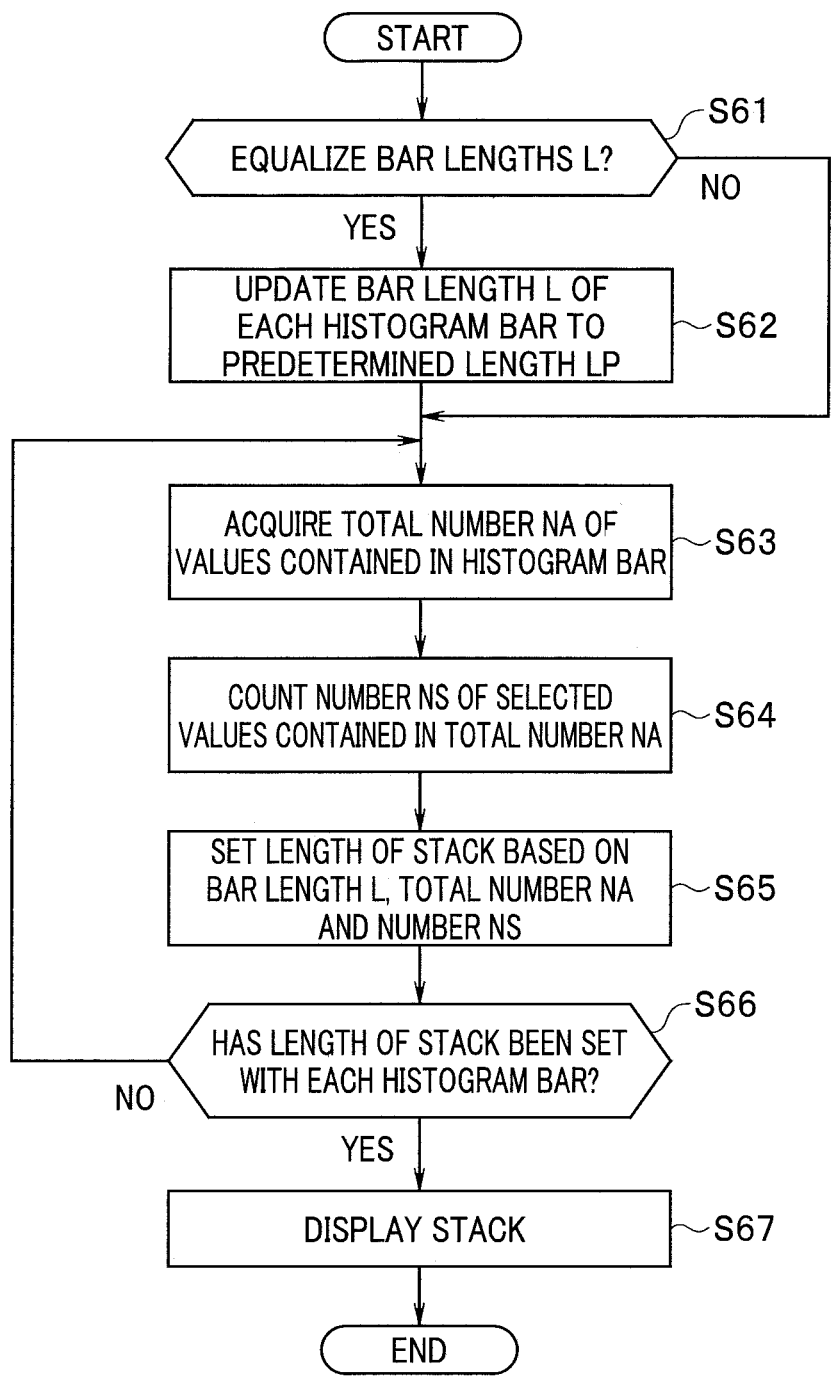
FIG. 7 is a flowchart showing a specific example of processing performed in the information presentation device according to the embodiment.

Here, a specific example of the processing performed in step S6 of FIG. 3 and the like will be described with reference to FIG. 7. FIG. 7 is a flowchart showing a specific example of processing performed in the information presentation device according to the embodiment.

The operation unit 21a determines whether the bar lengths L of the respective histogram bars 34 are equalized to a predetermined length (step S61 in FIG. 7).

When the bar lengths L of the respective histogram bars 34 are not equalized to a predetermined length (S61: NO), the operation unit 21a proceeds to execute processing of step S63 in FIG. 7 described later. When the bar lengths L of the respective histogram bars 34 are equalized to a predetermined length (S61: YES), the operation unit 21a executes processing for updating the bar length L of each of the histogram bars 34 to a predetermined length LP corresponding to a length in which the number NP of values (plot points) contained in each of the histogram bars is set to 100% (step S62 in FIG. 7), and then proceeds to execute processing in step S63 in FIG. 7.

Note that the determination processing of step S61 in FIG. 7 may be performed based on whether the control matched with the operation for equalizing the bar lengths L of the respective histogram bars 34 to a predetermined length has been performed by the control unit 21b, or may be performed based on whether a predetermined length LP has been set. For convenience of description, the following description will be made by exemplifying a case where the processing of step S62 of FIG. 7 has not been performed as a main example.

The operation unit 21a acquires the total number NA of values contained in the histogram bar 34 (step S63 in FIG. 7). Specifically, for example, when the knobs 33a and 33b have not been operated, the operation unit 21a acquires the number NP obtained by the processing of step S23 of FIG. 4 as the total number NA. For example, when either the knob 33a or the knob 33b has been operated, the number of respective plot points out of the range sandwiched between the knobs 33a and 33b is subtracted from the number NP obtained by the processing of step S23 of FIG. 4 to acquire the total number NA.

The operation unit 21a counts the number NS of selected values contained in the total number NA obtained by the processing of step S63 of FIG. 7 (step S64 of FIG. 7). Furthermore, the operation unit 21a stores the number NS obtained by the processing of step S64 of FIG. 7 into the RAM 23 while associating the number NS with each histogram bar 34.

The operation unit 21a performs processing for setting the ratio of the number NS to the total number NA in the histogram bar 34 as the stack length based on the bar length L, the total number NA, and the number NS (step S65 of FIG. 7).

The operation unit 21a determines whether the stack length has been set in each histogram bar 34 (step S66 in FIG. 7).

When there is any histogram bar 34 for which the stack length has not been set (S66: NO), the operation unit 21a repeatedly performs the processing from step S63 of FIG. 7. When the operation unit 21a has set the stack length in each histogram bar 34 (S66: YES), the operation unit 21a performs drawing processing for displaying the stack (step S67 in FIG. 7), and then finishes the series of processing of FIG. 7.

In other words, when one or more values of respective values plotted on a plurality of vertical axes of the PCP coordinate system are selected as selected values, as visual information with which the ratio of the number of selected values to the total number of values contained in any one histogram bar of the respective histogram bars generated by the processing of step S2 of FIG. 3 can be identified, the operation unit 21a having the function as the visual information generation unit executes the processing of generating a stack of the ratio in each histogram bar.

The operation unit 21a performs drawing processing for highlighting each of the traverse lines 32 corresponding to the selected values of the total number NA obtained by the processing of step S63 of FIG. 7 (step S7 of FIG. 3), and then finishes the series of processing of FIG. 3.

Figure 8:
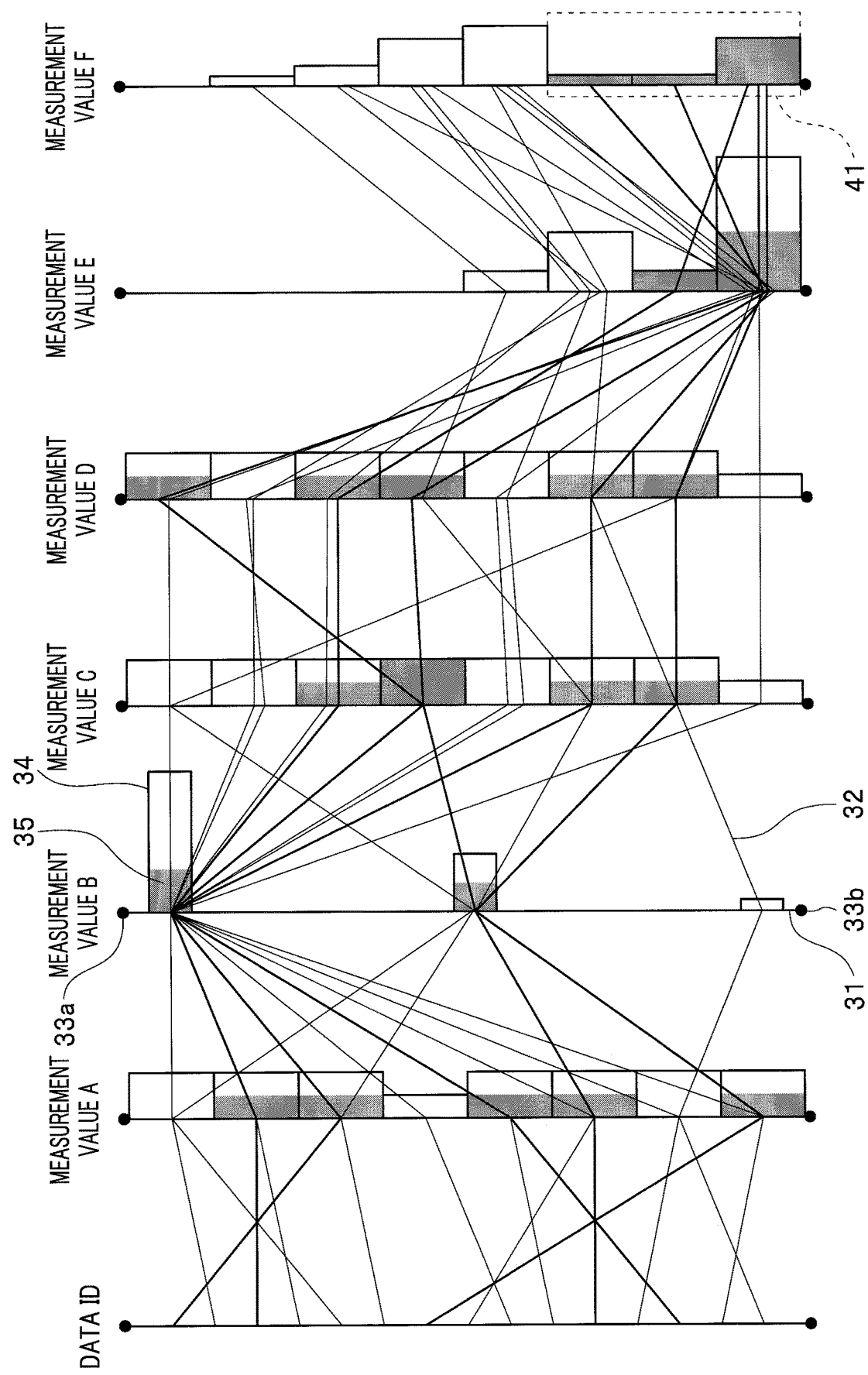
FIG. 8 is a diagram showing an example of information displayed in the information presentation device according to the embodiment.

For example, when respective values contained in three adjacent histogram bars 34 at a lower portion of the vertical axis 31 of the "measurement value F" in FIG. 5 are selected as selected values in step S5 in FIG. 3, the control unit 21b performs control for displaying a display image containing information as shown in FIG. 8 on the screen of the output device 25. Specifically, the control unit 21b performs control to display, on the screen of the output device 25, a display image containing a plurality of vertical axes 31, traverse lines 32, knobs 33a and knobs 33b, histogram bars 34, stacks 35 drawn inside the histogram bars 34, and a selection frame 41 indicating a selection range containing the selected values selected in step S5 of FIG. 3. FIG. 8 is a diagram showing an example of information displayed in the information presentation device according to the embodiment. Note that the selection frame 41 is drawn as a rectangular frame corresponding to the user's operation on the input device 24. Specifically, the selection frame 41 is drawn as, for example, a rectangular frame corresponding to a user's drag operation on a mouse or a user's touch operation on a touch panel.

The stack 35 in FIG. 8 is drawn such that an area having a length corresponding to the ratio of the number NS to the total number NA in inside of the histogram bar 34 is uniformly filled with predetermined color. Note that in the present embodiment, for example, when the ratio of the number NS to the total number NA is zero, the inside of the histogram bar 34 is filled with no color. The stacks 35 contained in the display image of FIG. 8 are visualized as information which makes it possible to analyze what values the multidimensional data containing the respective selected values selected so as to satisfy a condition that the selected values are plotted in the selection range of the selection frame 41 on the vertical axis 31 of the "measurement value F" have on the respective vertical axes 31 other than the vertical axis 31 of the "measurement value F". According to FIG. 8, the respective traverse lines 32 connecting a plurality of histogram bars 34 in which the stacks 35 are drawn, that is, the respective traverse lines 32 corresponding to the multidimensional data containing the selected values selected by the selection frame 41 are visualized while emphasized. Therefore, according to the present embodiment, visualization suitable for analysis of desired data contained in a large quantity of data can be performed.

Figure 9:
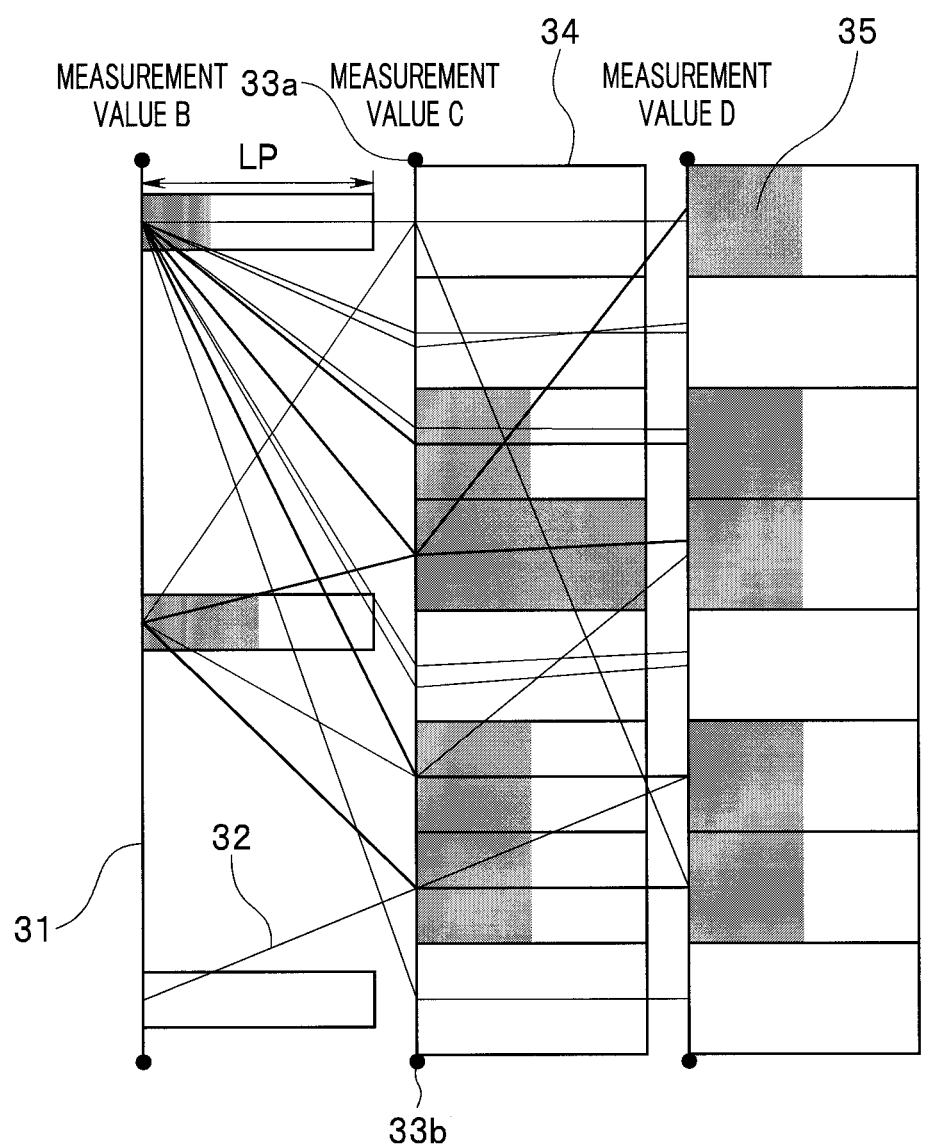
FIG. 9 is a diagram describing an example where the bar lengths of histogram bars are equalized to a predetermined length.

Note that according to the present embodiment, for example, when the processing of step S62 of FIG. 7, that is, the processing of equalizing the bar lengths L of the respective histogram bars 34 to a predetermined length is performed, a display image containing information as shown in FIG. 9 is displayed on the screen of the output device 25.

The stack 35 of FIG. 9 is drawn such that an area having a length corresponding to the ratio of the number NS of selected values to the total number NA is uniformly filled with predetermined color inside a histogram bar 34 having a predetermined length LP. Therefore, when the processing of step S62 of FIG. 7 is performed, for example, it is possible to enhance visibility of a stack 35 drawn inside a histogram bar 34 having a small total number NA. FIG. 9 is a diagram describing an example in the case where the bar lengths of the histogram bars are equalized to a predetermined length.

According to the present embodiment, in step S5 of FIG. 3, not only one selection range corresponding to the selection frame 41 is set, but also a plurality of selection ranges corresponding to a plurality of selection frames may be set.

In addition, when a plurality of selection ranges are set on two or more vertical axes 31, stacks corresponding to the number of pieces of multidimensional data containing selected values satisfying all the conditions corresponding to the plurality of selection ranges may be drawn. In other words, when a plurality of selection ranges for selecting selected values are set on two or more vertical axes of a plurality of vertical axes of the PCP coordinate system, the operation unit 21a according to the present embodiment may generate stacks corresponding to the number of pieces of multidimensional data containing selected values satisfying all the conditions corresponding to the plurality of selection ranges. According to the configuration as described above, for example, as shown in FIG. 10, stacks 35 are drawn which correspond to the number of pieces of multidimensional data containing selected values satisfying a first condition that the selected values are plotted within the selection range of the selection frame 41 on the vertical axis 31 of the "measurement value F" and a second condition that the selected values are plotted within the selection range of a selection frame 42 on the vertical axis 31 of the "measurement value D". Furthermore, according to the configuration as described above, for example, as shown in FIG. 10, the traverse lines 32 corresponding to the multidimensional data containing the selected values satisfying the first and second conditions described above are emphasized.

Figure 10:
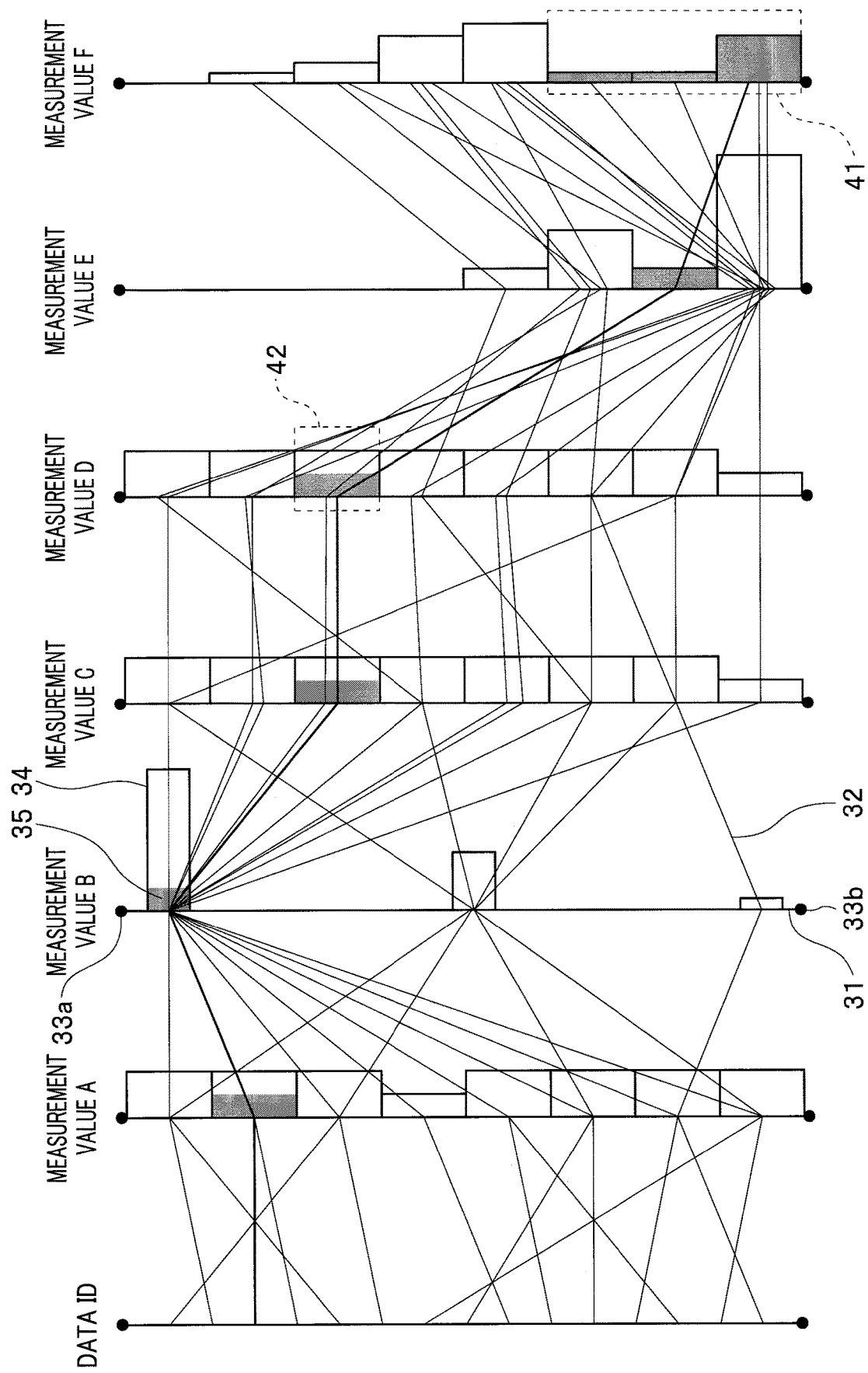
FIG. 10 is a diagram showing an example of information displayed in the information presentation device according to the embodiment.

Note that the selection frame 42 is drawn as a rectangular frame corresponding to the user's operation on the input device 24. Specifically, the selection frame 42 is drawn as, for example, a rectangular frame corresponding to a user's drag operation on a mouse or a user's touch operation on a touch panel. FIG. 10 is a diagram showing an example of information displayed in the information presentation device according to the embodiment.

According to the present embodiment, when two or more histogram bars are contained in one or more selection ranges set in step S5 of FIG. 3, respective stacks may be drawn with different colors or patterns corresponding to the two or more histogram bars. In other words, when respective values contained in two or more histogram bars which are adjacent to or discrete from one another on one vertical axis out of a plurality of vertical axes in the PCP coordinate system are selected as selected values, the operation unit 21a according to the present embodiment may execute processing of generating stacks with which the ratio of the number of selected values contained in any one of the two or more histogram bars to the total number of the selected values contained in the two or more histogram bars can be identified.

Figure 11:
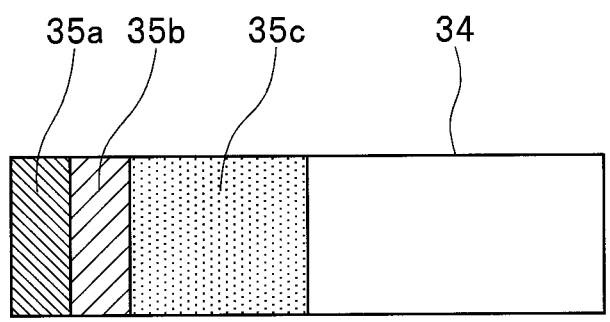
FIG. 11 is a diagram showing an example of a method of drawing stacks.

Specifically, for example, when three histogram bars 34 are contained in one selection range set in step S5 of FIG. 3, for example, a stack 35a having a pattern corresponding to a first histogram bar out of the three histogram bars 34, a stack 35b having a pattern corresponding to a second histogram bar out of the three histogram bars 34, and a stack 35c having a pattern corresponding to a third histogram bar out of the three histogram bars 34 may be respectively drawn as shown in FIG. 11.

Note that in such a case, the length of the stack 35a may be set according to the ratio of the number of selected values of the first histogram bar to the total number of selected values contained in the first, second and third histogram bars, the length of the stack 35b may be set according to the ratio of the number of selected values of the second histogram bar to the total number of the selected values, and the length of the stack 35c may be set according to the ratio of the number of selected values of the third histogram bar to the total number of the selected values. FIG. 11 is a diagram describing an example of a stack drawing method.

Each function of the information presentation device 11 of the information presentation system 1 of the present embodiment may be configured as a program. For example, programs are stored in an un-shown auxiliary storage device of a computer, and CPU 21 reads out, to a main storage device, a program for each function of the information presentation device 11 which is stored in the auxiliary storage device, and executes the program read out to the main storage device, whereby the computer can be caused to execute the functions of the respective units of the present invention. In other words, a computer in which a program for each function of the information presentation device 11 of the information presentation system 1 of the present embodiment is installed can operate as a computer device for performing each function of the information presentation device 11 of the information presentation system 1 of the present embodiment.

The programs may be provided to the computer with being recorded in a computer-readable recording medium. The computer-readable recording medium may be an optical disk such as CD-ROM, a phase change optical disk such as DVD-ROM, a magnetooptical disk such as MO (magnet optical) or MD (mini disk), a magnetic disk such as a floppy (registered trademark) disk or a removable hard disk, a memory card such as compact flash (registered trademark), smart media, an SD memory card, or a memory stick. In addition, a hardware device such as an integrated circuit (such as IC chip) which is specially designed and configured for the purpose of the present invention is also included as a recording medium. The database server 12 may be a file server (including one on the cloud).

Embodiments of the present invention have been described above. The embodiments are shown by way of example, and are not intended to limit the scope of the present invention. These novel embodiments can be implemented in other various forms, and various omissions, substitutions, and modifications can be made without departing from the subject matter of the invention. The embodiments and modifications thereof are included in the scope and the subject matter of the invention, and included in the invention described in the claims and the equivalents of the invention described in the claims.

Having described the preferred embodiments of the invention referring to the accompanying drawings, it should be understood that the present invention is not limited to those precise embodiments and various changes and modifications thereof could be made by one skilled in the art without departing from the spirit or scope of the invention as defined in the appended claims.

What is claimed is:

1. An information presentation device, comprising:
processing circuitry configured to plot a plurality of values contained in each of a plurality of pieces of multidimensional data on a plurality of axes in a parallel coordinate plot coordinate system;
divide each of the plurality of axes into a plurality of sections and generate a histogram including a plurality of histogram bars each of which corresponds to a number of values plotted within each section in the plurality of sections;
generate visual information with which a ratio of a number of selected values to a total number of values contained in any one histogram bar out of respective generated histogram bars is identified when one or more values out of respective values plotted on the plurality of axes are selected as the selected values; and
highlight at least one traverse line corresponding to the selected values selected, among a plurality of displayed traverse lines, each traverse line connecting respective points plotted on the plurality of axes,
wherein the processing circuitry is further configured to generate, as the visual information, a stack of the ratio in each of the generated histogram bars, and
wherein when respective values contained in two or more histogram bars that are adjacent to or discrete from one another on one axis out of the plurality of axes are selected as the selected values, the processing circuitry is further configured to perform processing to generate a stack with which the ratio of the number of the selected values contained in any one histogram bar out of the two or more histogram bars to the total number of the selected values contained in the two or more histogram bars is identified.

2. The information presentation device according to claim 1, wherein when a range for limiting values available for generation of the histogram is set on at least one axis of the plurality of axes, the processing circuitry is further configured to set a length of each histogram bar according to a number of values contained in the range.

3. The information presentation device according to claim 1, wherein the processing circuitry is further configured to equalize lengths of respective histogram bars contained in the histogram to a predetermined length.

4. The information presentation device according to claim 1, wherein when a plurality of selection ranges for selecting the selected values are set on two or more axes out of the plurality of axes, the processing circuitry is further configured to generate stacks corresponding to a number of pieces of multidimensional data containing selected values satisfying all conditions corresponding to the plurality of selection ranges.

5. An information presentation method, comprising:
plotting a plurality of values contained in each of a plurality of pieces of multidimensional data on a plurality of axes in a parallel coordinate plot coordinate system;
dividing each of the plurality of axes into a plurality of sections, and generating a histogram including a plurality of histogram bars each of which corresponds to a number of values plotted within each section in the plurality of sections;
when one or more values out of respective values plotted on the plurality of axes are selected as selected values, generating visual information with which a ratio of a number of the selected values to a total number of values contained in any one histogram bar out of the plurality of histogram bars is identified; and
highlighting at least one traverse line corresponding to the selected values selected, among a plurality of displayed traverse lines, each traverse line connecting respective points plotted on the plurality of axes,
wherein the method further comprises
generating, as the visual information, a stack of the ratio in each of the generated histogram bars, and
when respective values contained in two or more histogram bars that are adjacent to or discrete from one another on one axis out of the plurality of axes are selected as the selected values, perform processing to generate a stack with which the ratio of the number of the selected values contained in any one histogram bar out of the two or more histogram bars to the total number of the selected values contained in the two or more histogram bars is identified.

6. The method of claim 5, wherein when a particular value of the one or more values is selected on a first axis of the plurality of axes, the generating step comprises generating the visual information for a particular histogram on a second axis, different from the first axis, of the plurality of axes.

7. The method of claim 5, wherein each of the plurality of axes are parallel to each other.

8. The method of claim 5, wherein each histogram is on a separate one of the plurality of axes.

9. The method of claim 5, wherein the step of generating the visual information incudes identifying the ratio by changing a color of at least a portion of the one histogram bar.

10. A non-transitory storage medium in which a computer-readable program is stored, the program causing a computer to execute a method comprising:
plotting a plurality of values contained in each of a plurality of pieces of multidimensional data on a plurality of axes in a parallel coordinate plot coordinate system;
dividing each of the plurality of axes into a plurality of sections, and generating a histogram including a plurality of histogram bars each of which corresponds to a number of values plotted within each section in the plurality of sections;
generating visual information with which a ratio of a number of selected values to a total number of values contained in any one histogram bar out of respective histogram bars generated in the step of generating the histogram is identified when one or more values out of respective values plotted on the plurality of axes are selected as the selected values; and
highlighting at least one traverse line corresponding to the selected values selected, among a plurality of displayed traverse lines, each traverse line connecting respective points plotted on the plurality of axes,
wherein the method further comprises
generating, as the visual information, a stack of the ratio in each of the generated histogram bars, and
when respective values contained in two or more histogram bars that are adjacent to or discrete from one another on one axis out of the plurality of axes are selected as the selected values, perform processing to generate a stack with which the ratio of the number of the selected values contained in any one histogram bar out of the two or more histogram bars to the total number of the selected values contained in the two or more histogram bars is identified.

* * * * *